C. L. GOETHALS.
CORN-PLANTER.

No. 188,888. Patented March 27, 1877.

WITNESSES:
E. Wolff.
Alex F. Roberts

INVENTOR:
C. L. Goethals.
BY
ATTORNEYS.

UNITED STATES PATENT OFFICE.

CHARLES L. GOETHALS, OF LOS ANGELES, CALIFORNIA.

IMPROVEMENT IN CORN-PLANTERS.

Specification forming part of Letters Patent No. 188,888, dated March 27, 1877; application filed January 19, 1877.

*To all whom it may concern:*

Figure 1:
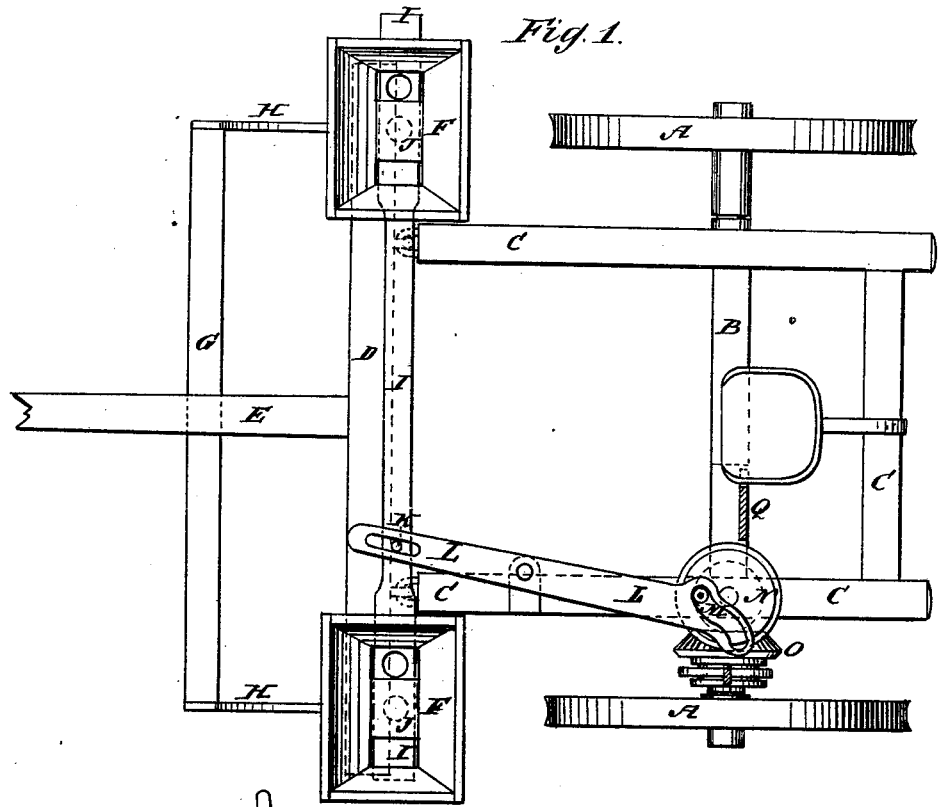
Figure 2:
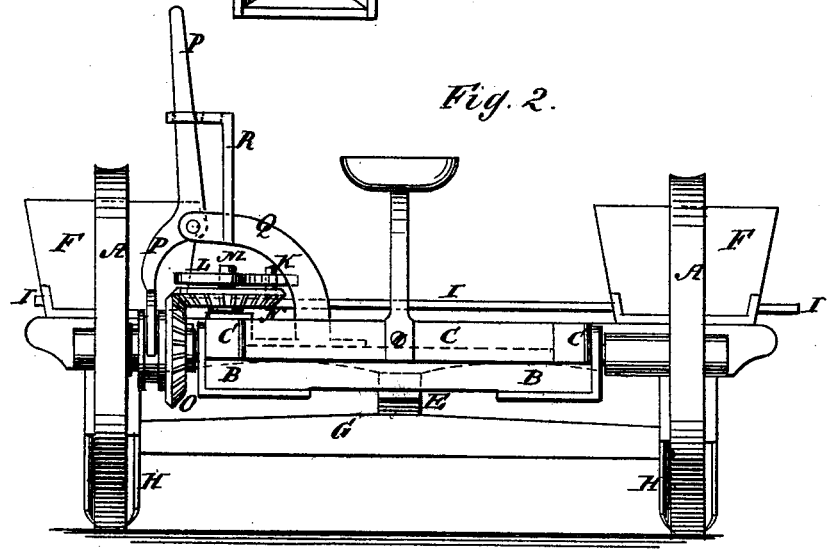

Be it known that I, CHARLES L. GOETHALS, of Los Angeles, in the county of Los Angeles and State of California, have invented a new and useful Improvement in Corn-Planters, of which the following is a specification:

Figure 1 is a top view of my improved machine. Fig. 2 is a rear view of the same.

Similar letters of reference indicate corresponding parts.

The object of this invention is to furnish an improved machine for planting corn, which shall be so constructed as to open a furrow to receive the seed, drop the seed, and cover it, and which shall be simple in construction and convenient in use.

The invention will first be described in connection with the drawing, and then pointed out in the claim.

A are the wheels, which revolve upon the journals of the axle B, and the faces of which are concaved to adapt them to cover the seed. To the axle B is attached the frame C, which consists of two side bars, connected at their rear ends by a cross-bar. To the forward ends of the side bars of the frame C is hinged a cross-bar, D, to the center of which is attached the tongue E, and to its ends are attached the hoppers F. To the tongue E is attached a cross-bar, G, to the ends of which are attached the runners H, by which the furrow is opened to receive the seed. The rear ends of the runners H are forked to open the furrow, and are connected with the ends of the cross-bar D. I is the dropping-bar, the ends of which pass through holes in the sides of the hoppers F, and have holes formed through them to receive the seed, and convey it to the discharge-holes in the bottom of the said hoppers, beneath the cut-offs J. To the dropping-slide I, near one of the hoppers F, is attached a pin, K, which passes through a short longitudinal slot in the forward end of the lever L. The lever L is pivoted to a support attached to the side bar of the frame C, and its rear end is widened, and has a slightly S-shaped slot formed in it to receive a crank-pin, M, attached to the bevel-gear wheel N pivoted to the side bar of the frame C. The crank-pin M should have a small roller placed upon it to lessen the friction. The teeth of the bevel-gear wheel N mesh into the teeth of the bevel-gear wheel O, placed upon the hub of the wheel A, and connected with it by a pin and slot, so that it may be carried around with said wheel in its revolution, and may be slid out and in to throw it out of and into gear with the gear-wheel N. The hub of the gear-wheel O has a ring-groove formed around its outer end to receive the forked end of the lever P, which is pivoted to an arm, Q, attached to the axle B. The upper end of the lever P moves along a notched arm of a bar, R, attached to the arm Q to lock the wheel O in gear and out of gear with the wheel N.

Having thus described my invention, I claim as new and desire to secure by Letters Patent—

The combination, with slide-bar I and horizontal wheel N, the latter operated by axle-wheel O, of the horizontal lever L, having a diagonal S-shaped slot at one end working over a crank-pin, M, and at the other a slot working over stud K, as and for the purpose specified.

CHARLES L. GOETHALS.

Witnesses:
H. MEYERSTEIN,
J. M. ROTHCHILD.